Jan. 17, 1961 L. C. LUDBROOK 2,968,758
LOW FREQUENCY ELECTRICAL GENERATORS
Filed March 25, 1958 2 Sheets-Sheet 1

INVENTOR
LESLIE CARTER LUDBROOK
ATTORNEY

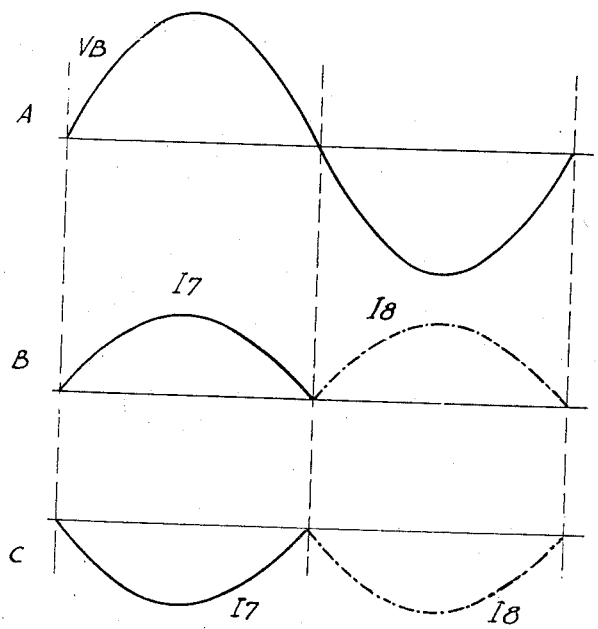
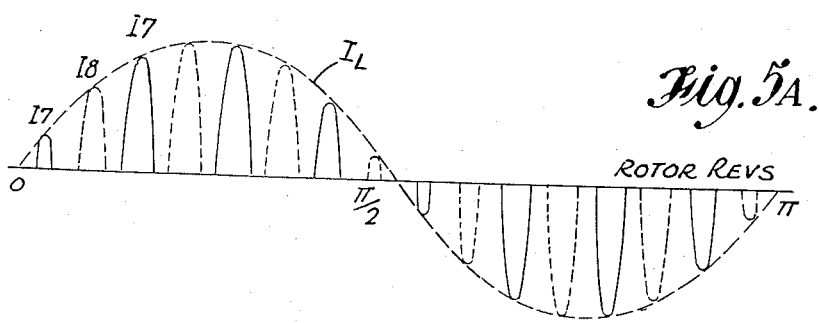

though at a slower rate until the point is reached when $I_S = \tfrac{1}{2} I_B$. At this point the current through A and D has fallen to zero and any further increase in $I_S$ must flow through the load, whilst the current through A and D remains zero.

United States Patent Office
2,968,758
Patented Jan. 17, 1961

2,968,758
LOW FREQUENCY ELECTRICAL GENERATORS

Leslie Carter Ludbrook, Cawston, near Rugby, England, assignor to The British Thomson-Houston Company Limited, London, England, a British company Filed Mar. 25, 1958, Ser. No. 723,855

Claims priority, application Great Britain Mar. 27, 1957

4 Claims. (Cl. 321—68)

This invention relates to low frequency electrical generators and is concerned with generators for producing a voltage which alternates at a variable low frequency, i.e. of the order of 10 cycles per second or less, or which can be held at any desired steady value.

The invention has an important application inter alia in positional control apparatus in which a positional type motor is fed with A.C. at a variable low frequency.

It is known to obtain a voltage of varying amplitude from an induction regulator in which an A.C. excited rotor is rotated relatively to one or more stator windings to induce alternating voltages in said stator windings of amplitude dependent on the angular displacement of the rotor relative to the stator winding.

It is also known to produce a variable frequency alternating voltage with rotational apparatus using commutators.

The object of the present invention is to produce an alternating voltage of variable low frequency using apparatus which is robust and does not require commutators or the like.

According to the present invention a low frequency A.C. voltage generator comprises an induction regulator having a rotor supplied with a single phase A.C. voltage, a stator with one or more phase windings and means for rotating said rotor at a required speed, a transformer associated with each of said stator windings and having its primary winding connected to said stator winding, two biassed rectifiers connected to two points of opposite polarity on the secondary winding of each of said transformers and each biassed with an A.C. voltage of the same frequency and phase as that supplied to the induction regulator rotor, and a load circuit having as many phases as the stator winding, connected to the output of each of said biassed rectifiers so that each phase of said load circuit is supplied with a variable D.C. voltage which corresponds at any given moment in magnitude and polarity with the instantaneous angular position of the induction regulator rotor relative to the associated stator winding.

The stator may have a single phase winding or a polyphase winding, in which latter case each phase would be connected through respective rectifier or rectifiers either with the load circuit or with separate load circuits, e.g. with the respective phases of a polyphase load circuit.

The invention has an important application in positional control apparatus, in which case the generator stator would have a polyphase stator winding feeding the respective phases of a polyphase positional type motor by which term is implied a motor whose angular positioning will follow that of the generator rotor (or will be a multiple or sub-multiple thereof).

Such a motor may, for instance, have a polyphase stator winding and a permanent magnet rotor, or may be a repulsion type motor.

The term biased rectifier bridge circuit as used herein implies a bridge connection of rectifiers having an alternating biasing voltage applied across one pair of opposite terminals and a controlled voltage, usually an A.C. voltage, across the second pair of opposite terminals, the arrangement being such that during one half cycle of the biasing voltage the bridge is conductive in both directions to the controlled voltage while during the opposite half cycle of the biasing voltage the bridge is non-conductive to the controlled voltage, provided the controlled voltage does not exceed the bias voltage in magnitude.

The invention will now be described with reference to the accompanying drawings in which:

Fig. 5 and 5a are graphs of the voltage and current waveforms.

The arrangement shown makes use of the biased rectifier principle, which relies on the fact that if a biasing voltage is applied across a rectifier in the forward, i.e. conducting, direction, then the rectifier will pass a superimposed alternating voltage in both directions, provided the amplitude of the alternating voltage is not greater than that of the bias voltage. This follows from the fact that during the half cycles in which the alternating current is in the forward direction it will merely be added to the bias current, whilst during the intervening half cycles in which the alternating current is in the reverse direction it will merely reduce the bias current without causing any actual current reversal.

If, on the other hand, the bias voltage is applied across a rectifier in the reverse direction, then a superimposed A.C. will be blocked in both directions unless its amplitude exceeds that of the bias voltage. It follows, therefore, that if an A.C. bias voltage is applied the rectifier will be conductive during alternate half cycles and non-conductive during intervening half cycles unless the superimposed voltage exceeds the bias.

Figure 1:
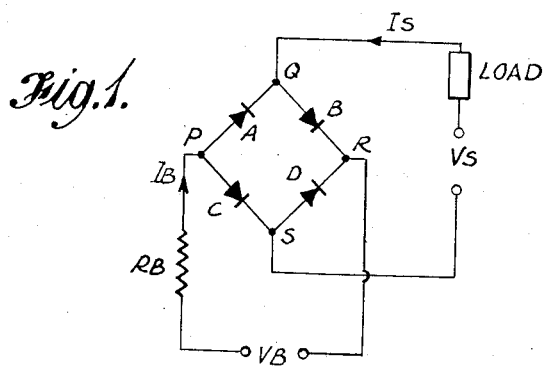
Fig. 1 is a circuit diagram illustrating the operation of a biased rectifier.

Referring to Fig. 1, A, B, C, D are four rectifier units connected to form a bridge rectifier; an alternating bias voltage $V_B$ is connected in series with a resistance $R_B$ across the junction points P and R and an alternating voltage $V_S$, which is to be controlled, is connected in series with the load across the alternate junction points, i.e. Q and S.

The operation of the circuit is as follows. During the half cycles of the bias voltage in which the left-hand terminal of $V_B$ is positive a bias current $I_B$ flows through the bridge circuit between P and R along two parallel paths, one path being through the rectifiers A and B and the other path being through the rectifiers C and D. During the intervening half cycles of bias voltage in which the right-hand terminal $V_B$ is positive a reverse bias voltage is applied across all the rectifiers.

Figure 2:
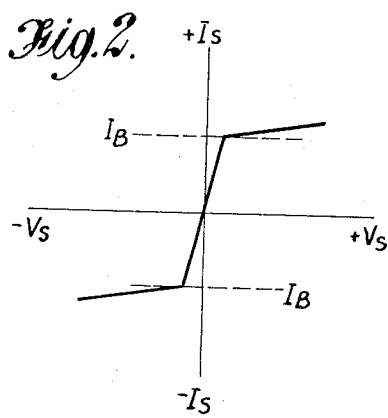
Figs. 2 and 3 are graphs showing the relation between voltage and current in the circuit of Fig. 1 for positive and negative half cycles of the biasing voltage respectively.

Fig. 2 shows the characteristic of the controlled current $I_S$ plotted against the voltage $V_S$. During positive half cycles of $V_B$ i.e. when the left-hand terminal of $V_B$ is positive and the current $I_B$ is in the direction indicated by the arrow, the current $I_S$ will tend to flow through the bridge between Q and S. It will be seen that, starting from the zero point, as the voltage $V_S$ increases positively $I_S$ rises uniformly and the current will tend to be in the reverse direction through A and D, but it will be remembered that these rectifiers are carrying a forward biasing current of value $\tfrac{1}{2} I_B$, so that $I_S$ will merely reduce this current. The current $I_S$ continues to rise until it reaches the value of the biasing current $I_B$ (in actual fact it will be when the current through the rectifiers $$\frac{I_S}{2} = \frac{I_B}{2}$$

When this value is reached the current through the rectifiers A and D has been reduced to zero, but cannot be reversed, owing to the polarity of the rectifiers. Any excess due to further increase of $I_S$ is therefore diverted through the external circuit which includes the bias source $V_B$ and the bias resistor $R_B$, the circuit being completed through the rectifiers B and C. Corresponding conditions occur for negative values of $V_S$, i.e. when $I_S$ is in the opposite direction to that of the arrow. In this case $I_S$ will flow in the reverse direction through rectifiers C and B until it reaches the value $I_B$ when it is again diverted through $R_B$.

Figure 3:
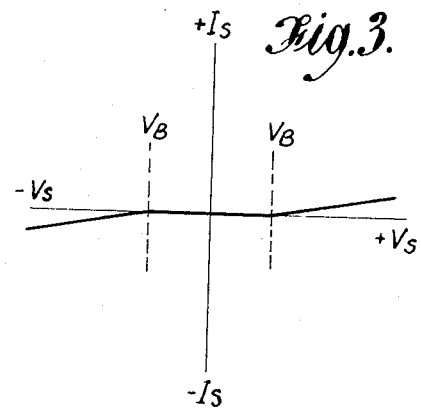

So far it has been assumed that $V_B$ is positive. Fig. 3 shows the conditions when the bias voltage $V_B$ is negative, i.e. the right-hand terminal of $V_B$ is now positive, so that a reverse voltage is applied across all the rectifiers. It follows that as $V_S$ increases in the positive direction from the zero point so current will flow until $V_S$ reaches a value numerically equal to $V_B$. Then $I_S$ flows through the bridge along the path through rectifier B, through the source $V_B$, through the bias resistance $R_B$ and through rectifier C. $I_S$ then increases in accordance with $V_S$, the slope of the characteristic depending upon the external load and the value of $R_B$. A similar effect occurs for negative values of $V_S$ when the path for $I_S$ is through rectifiers A and D.

Figure 4:
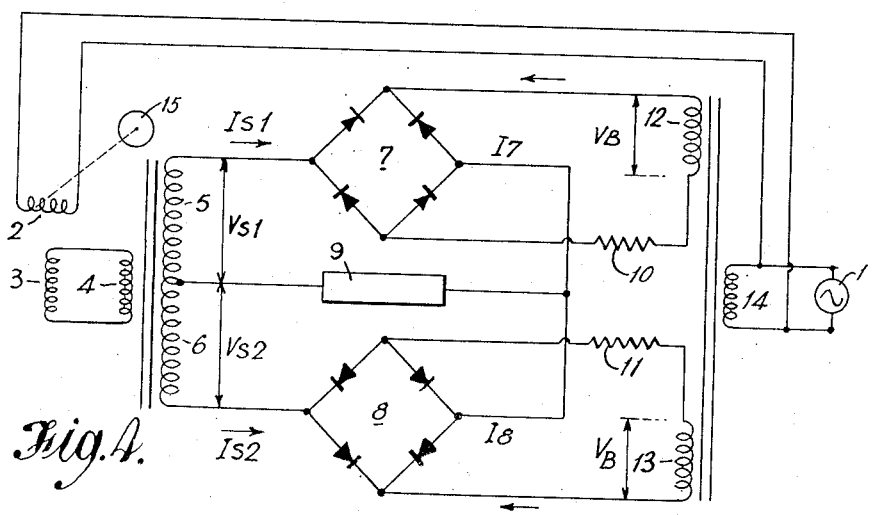
Fig. 4 is a circuit diagram of a variable low frequency generator using biased rectifiers in conjunction with an induction regulator.

Figure 4 shows a low frequency generator in which the reference 1 indicates a single phase A.-C. supply which is fed to the rotor 2 of an A.-C. generator of the induction regulator type, which rotor is rotatable by any suitable means, such as by a motor 15, relative to a fixed stator winding 3. The stator winding 3 is connected to the primary winding 4 of a transformer which has a centre tapped secondary winding, the two halves of which are indicated by the references 5 and 6 respectively. The end of the winding section 5 is connected to a biased rectifier bridge 7 and that of 6 to a biased rectifier bridge 8. The outputs of the biased rectifier bridges are connected across a common load circuit 9. The voltage supply source 1 is also connected across the primary winding 14 of a second transformer, having secondary windings 12 and 13, of which the winding 12 is connected across the bridge 7 through a resistor 10 and the winding 13 is connected across the bridge 8 through a resistor 11. The voltages obtained from the windings 12 and 13 are the biasing voltages and are denoted by $V_B$ and the voltages obtained from the winding sections 5 and 6 are denoted by $V_{S1}$ and $V_{S2}$ respectively. The rectifier bridge circuits are so arranged that during positive half cycles of $V_B$ the bridge 7 is conductive to $I_{S1}$ but the bridge 8 is non-conductive to $I_{S2}$, while during the negative half cycles of $V_B$ the bridge 8 is conductive to $I_{S2}$ but the bridge 7 is non-conductive to $I_{S1}$. The connections are such that output currents $I_7$ and $I_8$ are fed to the load circuit 9 in the same direction.

In Figure 5 the waveform A shows a cycle of bias voltage $V_B$ while the waveform B shows how the current $I_7$ will flow in the positive direction during the first half cycle of $V_B$, while current $I_8$ from rectifier 8 will flow also in the positive direction during the second half cycle of $V_B$. These conditions hold for a 180° rotation of the rotor 3. When, however, the rotor 3 is rotated a greater amount, the induced voltages $V_{S1}$ and $V_{S2}$ will reverse so that during the first half cycle of $V_B$, when bridge 7 is conductive, the current $I_7$ will be flowing in the negative direction, as shown in waveform C of Figure 5, and similarly during the second half cycle of $V_B$ when bridge 8 is conductive the current $I_8$ will also have reversed.

It follows, therefore, that if the rotor is continuously rotated the currents fed to the load 9 will be first in one direction and then in the other. Since the magnitude of the induced current $I_S$ will follow a cosine law with respect to the angle of rotation it follows that the load 9 will be fed with an alternating current which is in phase with the angular position of rotor 2 relative to the stator 3. This condition is illustrated in Figure 5a in which the line $I_L$ represents the current through the load circuit 9 and this is the envelope of the values of $I_7$ and $I_8$ which, as shown, appear alternately. It will be appreciated that the frequency of the load current need not be constant but will always correspond to the speed of rotation of the rotor 3 and if the rotor 3 is held stationary so the load current will also remain constant.

The above described low frequency generator may be used for the supply of positional type motors. Such a motor could, for example, be a synchronous type having a two phase stator winding and a permanent magnet rotor or it might be a repulsion type. In adapting the invention for use therewith the single phase stator winding 3 of Fig. 4 is replaced by a two phase winding the phases of which are in quadrature and each phase feeds a separate rectifier circuit of the kind shown in Fig. 4. The load of the first rectifier circuit is constituted by one of the phase windings of the motor and the load of the second rectifier circuit would be constituted by the other phase winding of the motor. Such an arrangement provides a positional drive in which the motor always takes up a position corresponding to that of the rotor winding 2 or, of course, in some cases the angular positioning of the driven motor might be a multiple or sub-multiple of the generator position depending on the number of poles in the motor.

What I claim is:

1. A low frequency A.C. voltage generator comprising an induction regulator having a rotor and a stator, means for rotating said rotor at a required speed, means for supplying a single phase A.C. voltage to said rotor, said stator having at least one phase winding, a transformer associated with said stator phase winding, said transformer having a primary winding connected to said stator phase winding, said transformer having a secondary winding, two bridge rectifier circuits associated with said transformer, each of said bridge rectifier circuits having an input and an output junction with two branch circuits connected therebetween and having an intermediate junction in each branch circuit, said output junctions being connected respectively to different points in the secondary winding of the associated transformer, means for supplying an A.C. biasing voltage across the two intermediate junctions of each of said bridge rectifier circuits so as to control the current flow through said circuits, and a load circuit connected between said output junctions of said bridge rectifier circuits and the associated secondary transformer winding in a manner so that said load circuit is supplied with voltage which corresponds at any given moment in magnitude and polarity with the instantaneous angular position of said induction regulator rotor relative to the associated stator phase winding.

2. A low frequency A.C. voltage generator comprising an induction regulator having a rotor and a stator, means for rotating said rotor at a required speed, means for supplying a single phase A.C. voltage to said rotor, said stator having at least one phase winding, a transformer associated with said stator phase winding and having a primary winding connected to said stator phase winding, a secondary winding for said transformer, two bridge rectifier circuits associated with said transformer, each of said bridge rectifier circuits having an input and an output junction with two branch circuits connected therebetween and having an intermediate junction in each branch circuit, said input junctions being connected respectively to the opposite ends of said transformer secondary winding, means for supplying an A.C. biasing voltage across the two intermediate junctions of each of said bridge rectifier circuits so as to control the current flow through said circuits, and a load circuit connected between the output junctions of said bridge rectifier circuits and the center point of the associated secondary winding so that said load circuit is supplied with a voltage which corresponds at any given moment in magnitude and polarity with the instantaneous angular position of said induction regulator rotor relative to the associated stator phase winding.

3. A low frequency A.C. voltage generator comprising an induction regulator having a rotor and a stator, means for rotating said rotor at a required speed, means for supplying a single phase A.C. voltage to said rotor, said stator having at least one phase winding, a transformer associated with said phase winding and having a primary winding connected to said stator phase winding, two bridge rectifier circuits associated with said transformer and each comprising four rectifier units connected in pairs in series in the same sense so as to form two parallel rectifying paths with an input junction and an output junction connected to opposite common terminals of each two parallel paths, an intermediate junction in each of said paths, said transformer having a secondary winding, respective connections between the input junction of each of said rectifier circuits and points of opposite polarity in said transformer secondary winding, means for supplying an A.C. biasing voltage of the same frequency and phase as that supplied to the induction regulator stator across the intermediate junctions of each of said pairs of rectifying paths so as to control the current flow therein, and a load circuit connetced between the outputs junctions of said rectifier circuits and the associated secondary winding so that said load circuit is supplied with a voltage which corresponds in any given moment in magnitude and polarity with the instantaneous angular position of said induction regulator rotor relative to the associated stator phase winding.

4. A low frequency A.C. voltage generator comprising an induction regulator having a rotor and a stator, means for rotating said rotor at a required speed, means for supplying a single phase A.C. voltage to said rotor, said stator having at least one phase winding, a transformer associated with said phase winding and having a primary winding connected to said stator phase winding, two bridge rectifier circuits associated with said transformer each comprising four rectifier units connected in pairs in series in the same sense so as to form two parallel rectifying paths with an input junction and an output junction connected to opposite common terminals of each two parallel paths, an intermediate junction in each of said paths, said transformer having a secondary winding, respective connections between the input junction of each of said rectifier circuits and the opposite ends of said transformer secondary winding, means for supplying an A.C. biasing voltage of the same frequency and phase as that supplied to the induction regulator rotor across the intermediate junctions of each of said pairs of rectifying paths so as to control the current flow therein, and a load circuit connected between the output junctions of said rectifier circuits and the center point of the associated secondary winding so that said load circuit is supplied with a voltage which corresponds at any given moment in magnitude and polarity with the instantaneous angular position of said induction regulator rotor relative to the associated stator phase winding.

References Cited in the file of this patent
UNITED STATES PATENTS

| 1,992,625 | Mathes | Feb. 26, 1935 |
| 2,501,543 | Short | Mar. 21, 1950 |